US010720955B2

(12) United States Patent
Kim et al.

(10) Patent No.: US 10,720,955 B2
(45) Date of Patent: Jul. 21, 2020

(54) METHOD FOR REMOVING MAGNETIC INTERFERENCE SIGNAL ACCORDING TO USE OF FDR SCHEME, AND DEVICE FOR REMOVING MAGNETIC INTERFERENCE SIGNAL

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Dongkyu Kim, Seoul (KR); Byung-Wook Min, Seoul (KR); Donghyun Lee, Gwacheon-si (KR); Kwangseok Noh, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 181 days.

(21) Appl. No.: 16/071,258

(22) PCT Filed: Jan. 20, 2016

(86) PCT No.: PCT/KR2016/000605
§ 371 (c)(1),
(2) Date: Jul. 19, 2018

(87) PCT Pub. No.: WO2017/126717
PCT Pub. Date: Jul. 27, 2017

(65) Prior Publication Data
US 2020/0169287 A1    May 28, 2020

(51) Int. Cl.
*H04B 1/44* (2006.01)
*H04B 1/48* (2006.01)
(Continued)

(52) U.S. Cl.
CPC ............... *H04B 1/48* (2013.01); *H04B 7/04* (2013.01); *H04B 15/02* (2013.01)

(58) Field of Classification Search
CPC . H04B 1/44; H04B 1/40; H04B 1/525; H04B 17/102; H04B 1/04; H04B 1/0475;
(Continued)

(56) References Cited

U.S. PATENT DOCUMENTS 6,531,936 B1 * 3/2003 Chiu .................. H01P 1/2016
333/164
8,742,981 B2 * 6/2014 Jungmaier ............ G01S 7/034
342/175
(Continued)

FOREIGN PATENT DOCUMENTS

WO    WO 2007/033967 A1    3/2007

*Primary Examiner* — Nhan T Le
(74) *Attorney, Agent, or Firm* — Birch, Stewart, Kolasch & Birch, LLP

(57) ABSTRACT

An apparatus for removing a magnetic interference signal according to a use of a full duplex radio (FDR) scheme comprises a plurality of Rat race couplers; and a plurality of antenna pairs in which two antennas are paired, wherein each of the plurality of antenna pairs are disposed at equal intervals from each other, a first output port between two output ports of a first Rat race coupler from among the plurality of Rat race couplers is connected to a first antenna of a first antenna pair and a second output port is connected to a second antenna of the first antenna pair, a third output port between two output ports of a second Rat race coupler from among the plurality of Rat race couplers is connected to a third antenna of a second antenna pair, and a fourth output port is connected to a fourth antenna of the second antenna pair.

8 Claims, 11 Drawing Sheets

(51) Int. Cl.
*H04B 7/04* (2017.01)
*H04B 15/02* (2006.01)

(58) Field of Classification Search
CPC ...... H04B 1/1027; H04B 7/0404; H04B 1/48; H04B 7/0413
See application file for complete search history.

(56) References Cited

U.S. PATENT DOCUMENTS

| | | | |
|---|---|---|---|
| 9,124,005 B2* | 9/2015 | Nguyen | H01Q 13/20 |
| 9,461,612 B2* | 10/2016 | Ding | H01P 5/222 |
| 9,571,153 B2* | 2/2017 | Kim | H04B 1/44 |
| 2012/0139661 A1 | 6/2012 | Itoh et al. | |
| 2014/0097995 A1 | 4/2014 | McKinzie, III | |
| 2014/0347234 A1 | 11/2014 | Caloz et al. | |
| 2015/0215937 A1 | 7/2015 | Khandani | |

* cited by examiner

One input mode             Two input mode

--- Communication Region (TX AF > 0 dB & RXP AF > 0 dB)
— TX Null Region (TX AF < -6 dB)

RX2 =[(+TX1)×a+(-TX1)×b]+[(+TX1)×b+(-TX1)×a]
    =a×(TX1-TX1)+b×(TX1-TX1)
    =0

METHOD FOR REMOVING MAGNETIC INTERFERENCE SIGNAL ACCORDING TO USE OF FDR SCHEME, AND DEVICE FOR REMOVING MAGNETIC INTERFERENCE SIGNAL

CROSS REFERENCE TO RELATED APPLICATIONS

This application is the National Phase of PCT/KR2016/000605 filed on Jan. 20, 2016, which is hereby expressly incorporated by reference into the present application.

TECHNICAL FIELD

The present invention relates to wireless communication, and more particularly, to a method for canceling a self-interference signal according to use of an FDR scheme and a device for canceling a self-interference signal.

BACKGROUND ART

A full duplex radio (FDR) or full duplex communication scheme refers to a communication scheme for simultaneously supporting transmission and reception using the same resource in one user equipment (UE). In this case, the same resource refers to the same time and the same frequency. FDR communication or full duplex communication is referred to as two-way communication.

FIG. 1 is a conceptual diagram illustrating a UE and a base station (BS), which support FDR.

Referring to FIG. 1, in a network state that supports FDR, there are three types of interferences. First interference is intra-device self-interference. The intra-device self-interference means that signals transmitted from a transmission (Tx) antenna and received by a receiving (Rx) antenna act as interference in one BS or UE. Since the signals transmitted from the Tx antenna are transmitted with high power and a distance between the Tx antenna and the Rx antenna is short, the transmitted signals are received by the Rx antenna without almost of attenuation, and thus, are received with higher power than a desired signal. Second interference is UE to UE inter-link interference. In a network that supports FDR, the UE to UE inter-link interference is increasingly caused. The UE to UE inter-link interference refers to interference caused by uplink signals that are transmitted from a UE and received by a neighboring UE. Third interference is BS to BS inter-link interference. Similarly, in a network state that supports FDR, BS to BS inter-link interference is increasingly caused. The BS to BS inter-link interference refers to interference caused by signals that are transmitted between BSs or heterogeneous BSs (pico, femto, and relay) in a HetNet state and received by an Rx antenna of another BS.

Among the three types of interferences, the intra-device self-interference (hereinafter, referred to as self-interference) is influence of interference caused only in FDR. In order to manage FDR, the most serious problem is cancellation of self-interference.

DISCLOSURE

Technical Problem

An object of the present invention is to provide a device for canceling a self-interference signal according to use of a full duplex radio (FDR) scheme.

Another object of the present invention is to provide a method for canceling a self-interference signal according to use of a full duplex radio (FDR) scheme.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve one object of the present invention, an apparatus for canceling a self-interference signal according to use of a full duplex radio (FDR) scheme comprises a plurality of rat race couplers; and a plurality of antenna pairs in which two antennas are paired, wherein each antenna of the plurality of antenna pairs is arranged at constant intervals from each other, wherein a first output port of two output ports of a first rat race coupler in the plurality of rat race couplers is connected to a first antenna of a first antenna pair and a second output port of the two output ports of the first rat race coupler is connected to a second antenna of the first antenna pair, a third output port of two output ports of a second rat race coupler in the plurality of rat race couplers is connected to a third antenna of a second antenna pair, and a fourth output port of the two output ports of the second rat race coupler is connected to a fourth antenna of the second antenna pair. The first antenna pair is arranged at a same distance from a center of the first rat race coupler. The second antenna pair is arranged at a same distance from a center of the second rat race coupler. The number of the plurality of pairs is an even number. Each of the antennas is transmitting and receiving antennas for enabling transmission and reception of signals.

To achieve another object of the present invention, a method for canceling a self-interference signal according to use of a full duplex radio (FDR) scheme comprises respectively arranging, each antenna of a plurality of antenna pairs in which two antennas are paired, at constant intervals from each other; connecting a first output port of two output ports of a first rat race coupler in a plurality of rat race couplers to a first antenna of a first antenna pair and connecting a second output port of the two output ports of the first rat race coupler to a second antenna of the first antenna pair; and connecting a third output port of two output ports of a second rat race coupler in the plurality of rat race couplers to a third antenna of a second antenna pair and connecting a fourth output port of the two output ports of the second rat race coupler to a fourth antenna of the second antenna pair. The method may further comprise arranging the first antenna pair at a same distance from a center of the first rat race coupler. Each of the antennas is transmitting and receiving antennas for enabling transmission and reception of signals.

Advantageous Effects

A problem that an unavailable communication region may be solved through MIMO when TX and RX beam patterns of one antenna (or a pair of antennas) are different from each other. A problem caused by different TX and RX beam patterns in a system that achieves passive SIC by using the antenna pair together with a rat race coupler may be solved using a MIMO system which uses multiple antennas.

Also, a cross talk interference problem generated between several antennas when a full duplex communication system and a MIMO system are used together may be solved.

Frequency usage efficiency may remarkably be increased using full duplex communication and MIMO by antenna arrangement according to the embodiment of the present invention.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
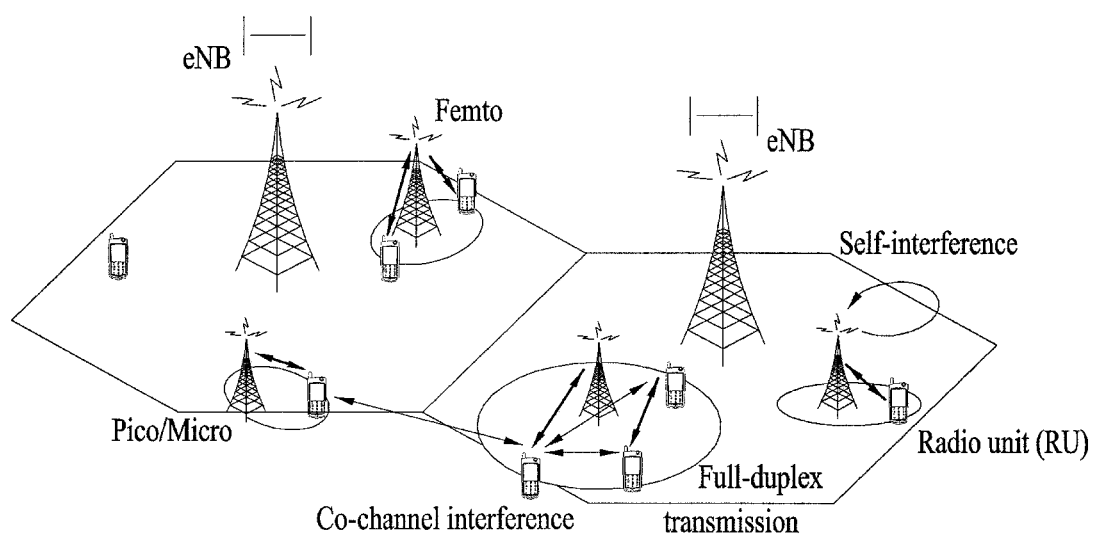
FIG. 1 is a conceptual diagram illustrating a UE and a base station, which support FDR.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
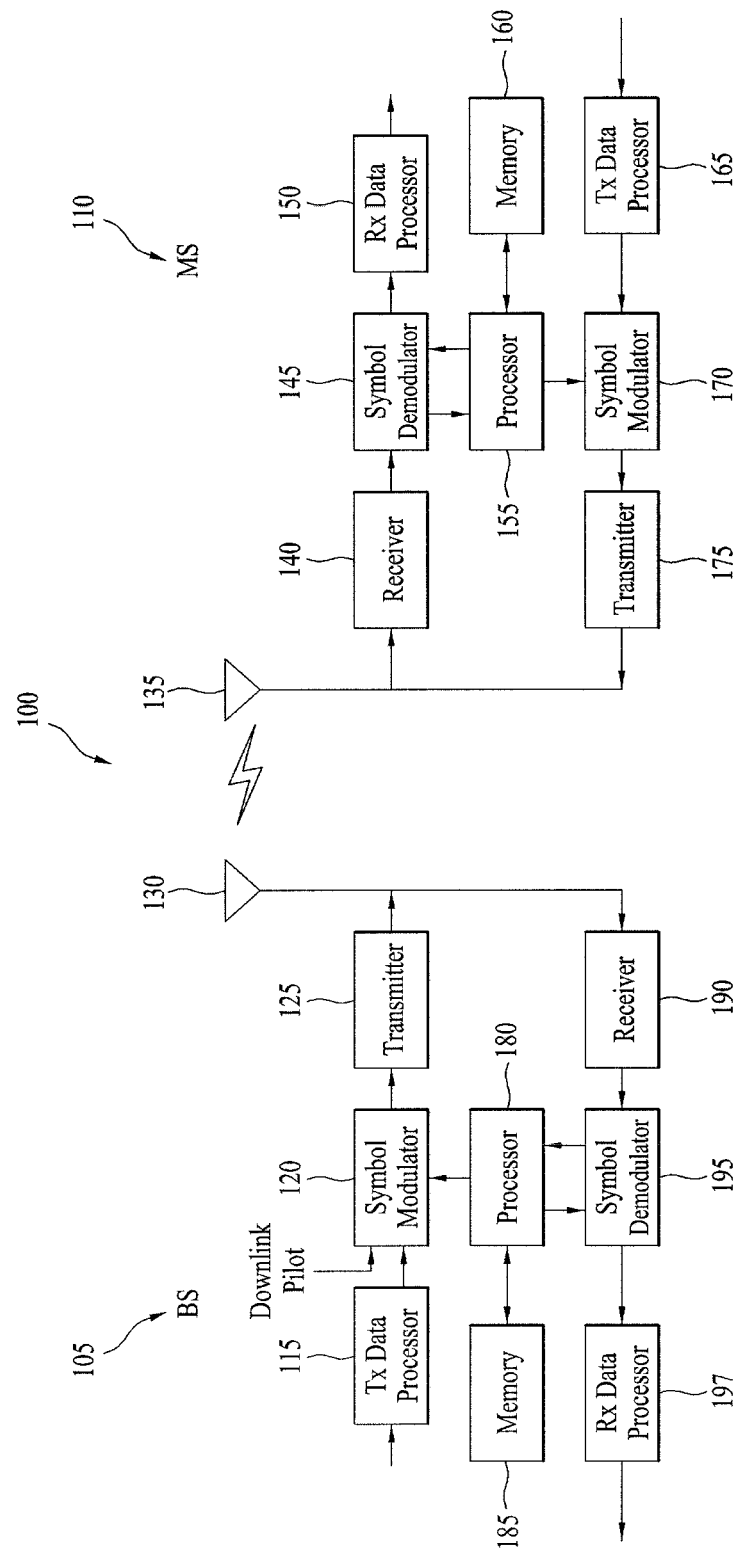
FIG. 2 is a block diagram illustrating a configuration of a base station 105 and a UE 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
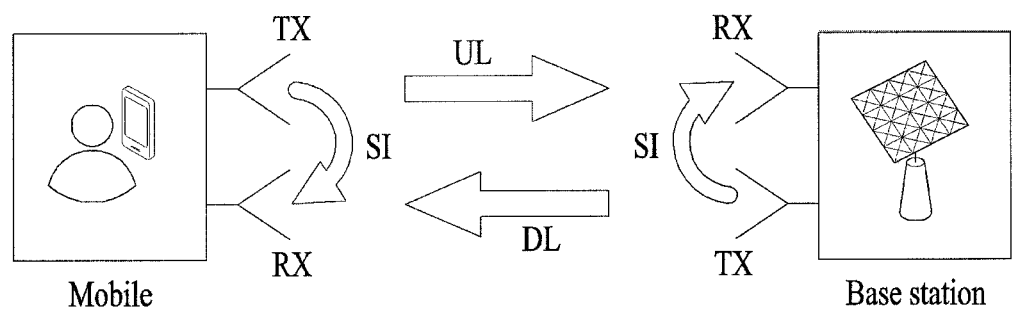
FIG. 3 is an exemplary diagram illustrating a concept of self-interference.

FIG. 3 is an exemplary diagram illustrating a concept of self-interference.

As illustrated in FIG. 3, a signal transmitted by a user equipment UE1 is received by an Rx antenna of the same user equipment without change to function as interference (which is referred to as SI). This type of interference involves particular points unlike other forms of interference. The particular points are as below. First, a signal that acts as the interference may be regarded as a perfectly known signal. Second, the signal that acts as the interference has significantly greater power than that of a desired signal. As a result, the signal that acts as the interference may not be completely cancelled at a receiving end even though the signal is perfectly known.

FDR takes advantage of two existing schemes of time division duplex (TDD) and frequency division duplex (FDD). In addition, FDR is a communication scheme of simultaneously performing transmission and reception in the same frequency domain. In this case, a problem of an SI (self-interference) signal occurs. The SI signal refers to a signal that returns to a receiving end after being transmitted. Since a transmission frequency band is the same as a reception frequency band in FDR, a received signal and the SI signal may not be distinguished from each other at a radio frequency (RF) end. SI cancellation (SIC) is a core technology of FDR.

In general, SIC is performed in two steps in FDR. In the first step corresponding to passive cancellation, transmission and reception paths are separated from each other using a circulator at an antenna end or using different radio wave polarizations between transmission and reception. In the second step corresponding to active cancellation, an SI signal that remains after the passive cancellation is performed before entering a low noise amplifier (LNA). In a basic principle of the active cancellation, an SI duplicate signal is generated independently of a receiving end path and is subtracted from a receiving end signal which is made up of a sum of a received signal and a remaining SI signal.

Figure 4:
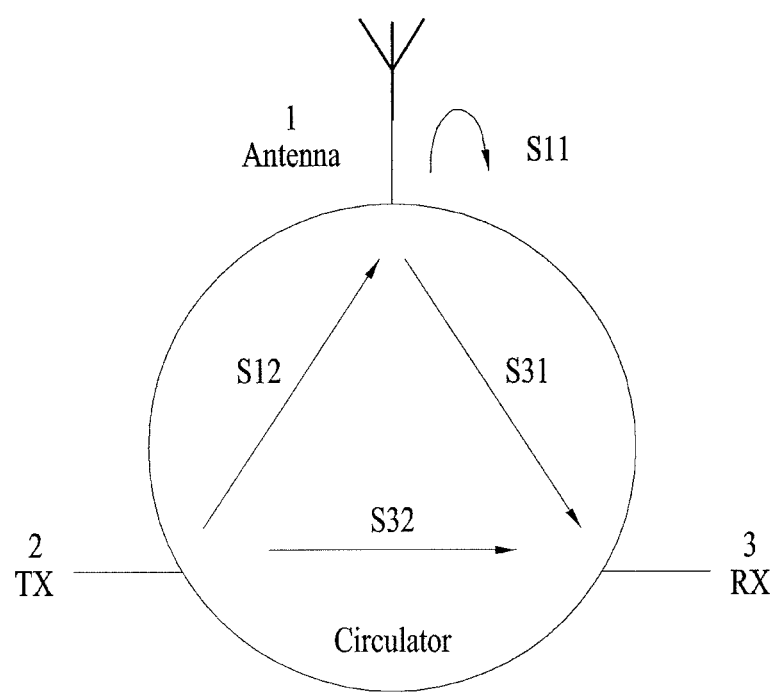
FIG. 4 is a conceptual diagram illustrating passive cancellation based on a circulator.

FIG. 4 is a conceptual diagram illustrating passive cancellation based on a circulator.

The circulator is basically a 3-port device and is intended to deliver a signal input to each port in one direction. In an ideal circulator, equations S12=S31=1 and S32=0 are satisfied, and perfect isolation may be obtained between a Tx antenna and an Rx antenna. However, in practice, isolation of the circulator is limited and is generally restricted to S32=−15 dB.

Referring to FIG. 4, the SI signal from the Tx antenna to the Rx antenna is made up of a sum of two types of signals below.

① TX direct leakage signal: S32
② Antenna mismatch SI signal: S12*S11*S31≈S11

The type ① signal exhibits isolation performance of −15 dB in a general circulator. In an existing FDR scheme using the circulator, an SI signal is modeled only by the type ① signal (TX direct leakage signal) and thus SIC of −15 dB is achieved using the passive cancellation scheme. However, the type ② signal (≈S11) may have a greater magnitude than that of the type ① signal (S32) depending on conditions. Referring to FIG. 4, S11 refers to a signal corresponding to a Tx signal which is transmitted to an antenna and returns to the circulator again due to antenna mismatch. Due to an operation characteristic of the circulator, the signal enters an Rx port without being filtered. In a circumstance in which the antenna mismatch is significant (for example, in a surrounding environment having a lot of reflectors), S11 is −10 dB and thus an SI signal substantially greater than the type ① signal enters the Rx port.

Therefore, the passive cancellation scheme using the circulator fails to provide a mechanism for cancelling the SI signal generated due to the antenna mismatch and thus may not achieve significant SIC performance. In addition, when the circulator is used at an RF front-end for full-duplex radio communication, a ferrite material needs to be included due to an operation mechanism of the circulator. Thus, the RF front-end may not be integrated. Moreover, when SIC performance of the first step corresponding to the passive cancellation is −15 dB, problems of losses of Rx and Tx signals and an increase in power consumption occur. Here, the problems occur when SIC of the additional second step corresponding to the active cancellation is performed.

Figure 5:
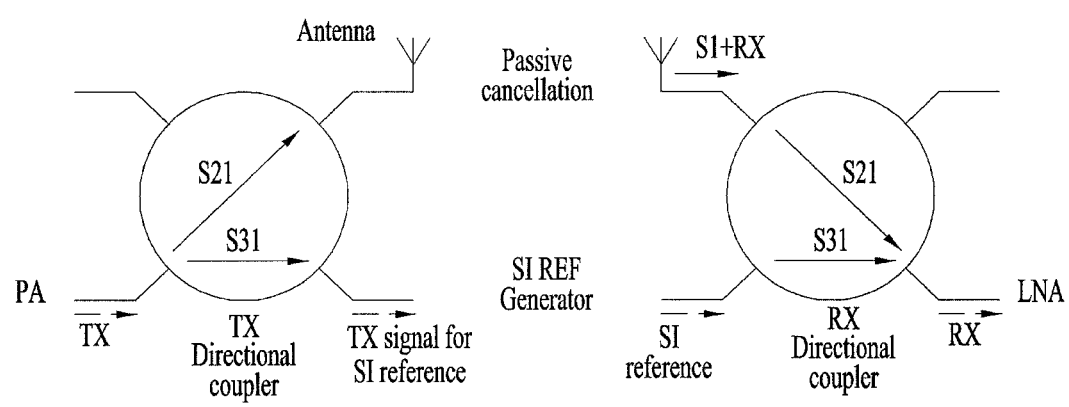
FIG. 5 is an exemplary diagram illustrating a concept of active cancellation.

FIG. 5 is an exemplary diagram illustrating a concept of active cancellation.

Referring to FIG. 5, a slight part of a Tx signal coming from a power amplifier is sent to an SI REF generator using a Tx directional coupler, and the SI REF generator generates a signal (SI reference signal) identical to an SI signal that remains after the passive cancellation using the Tx signal. The duplicated SI reference signal is subtracted from an SI signal entering together with an Rx signal using an Rx directional coupler. Referring to FIG. 5, the SI signal and the duplicated SI reference signal arriving at an input port of an LNA have the same power. Due to a characteristic of the directional coupler, an equation S21+S31=1 is satisfied at all times and an inequality S21>>S31 is satisfied to minimize the Tx and Rx losses, which indicates that the Tx and Rx losses may be minimized through a high level of SIC using the passive cancellation. When the SI signal and the duplicated SI reference signal arriving at the input port of the LNA need to have the same power, an amplifier needs to be used in the SI REF generator to reduce the Tx and Rx losses using restricted SIC performance of the passive cancellation, which causes additional power consumption of the SI REF generator.

Figure 6:
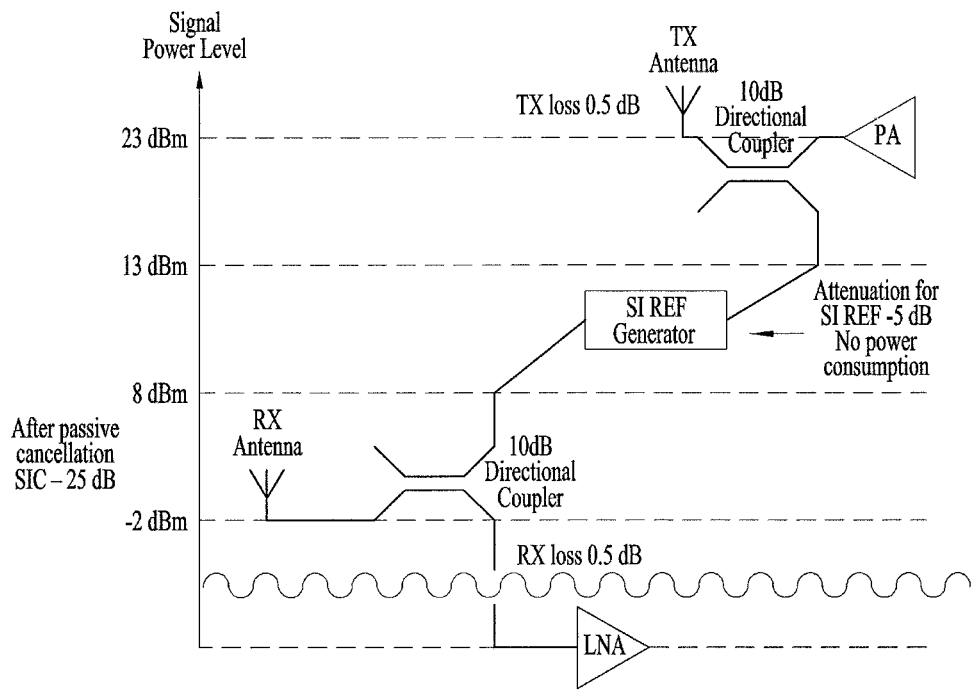
FIG. 6 is an exemplary diagram illustrating consumption cost, TX and RX loss and additional power consumption according to active cancellation in FIG. 5.

FIG. 6 is an exemplary diagram illustrating consumption cost, TX and RX loss and additional power consumption according to active cancellation in FIG. 5.

FIG. 6 corresponds to a case in which the Rx and Tx directional couplers corresponding to Rx/Tx loss of 0.5 dB are used and passive cancellation SIC is −25 dB. For the active cancellation, the slight part of the Tx signal coming from a front of the power amplifier is sent to the SI REF generator using the Tx directional coupler. In this case, the Tx loss of 0.5 dB is generated. In addition, FIG. 6 illustrates that the Rx loss of 0.5 dB is generated when the duplicated SI reference signal is subtracted from the SI signal entering together with the Rx signal is subtracted using the Rx directional coupler.

Figure 7:
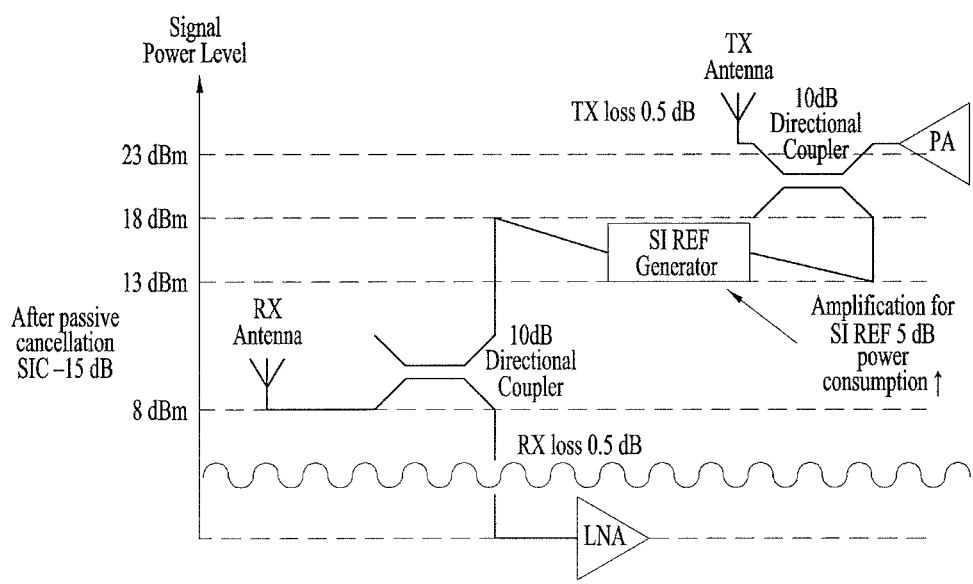
FIG. 7 is an exemplary diagram illustrating consumption cost, TX and RX loss and additional power consumption according to active cancellation in FIG. 5.

FIG. 7 is an exemplary diagram illustrating consumption cost, TX and RX loss and additional power consumption according to active cancellation in FIG. 5.

FIG. 7 corresponds to a case in which the Rx and Tx directional couplers corresponding to Rx/Tx loss of 0.5 dB are used and passive cancellation SIC is −15 dB. Similarly to FIG. 6, for the active cancellation, the slight part of the Tx signal coming from the front of the power amplifier is sent to the SI REF generator using the Tx directional coupler. In this case, the Tx loss of 0.5 dB is generated. In addition, the Rx loss of 0.5 dB is generated when the duplicated SI reference signal is subtracted from the SI signal entering together with the Rx signal using the Rx directional coupler.

Referring to FIG. 7, the amplifier is used in the SI REF generator to reduce the Tx loss, resulting in the additional power consumption.

Figure 8:
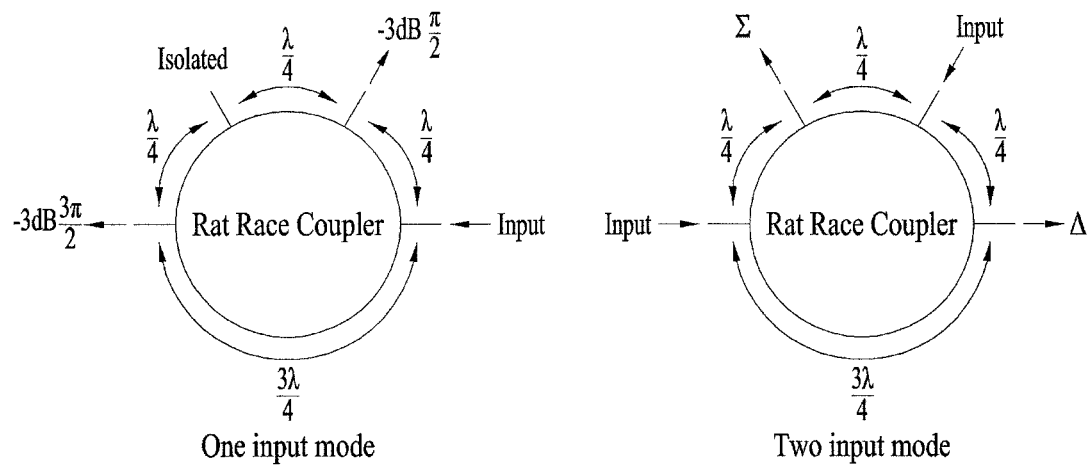
FIG. 8 is an exemplary diagram illustrating an operation principle of a rat race coupler.

FIG. 8 is an exemplary diagram illustrating an operation principle of a rat race coupler.

The rat-race coupler (also known as a hybrid ring coupler) is a type of a coupler used in RF and Microwave systems. In its simplest form, it is a 3 dB coupler and is thus an alternative to a magic tee. Compared to the magic tee, it has the advantage of being easy to realize in planar technologies such as microstrip and stripline, although waveguide rat races are also practical. Unlike magic tees, a rat-race needs no matching structure to achieve correct operation.

The rat-race coupler has four ports. When one of the ports is used as an input port (one-input mode of FIG. 8), two ports operate as output ports to send signals having a phase difference of 180 degrees, and the remaining one port operates as an isolated port (−40 dB). Alternatively, when two ports are used as input ports (two-input mode of FIG. 8), the remaining two ports operate as output ports to send a sum signal and a difference signal, respectively, of input signals. In this way, the rat race coupler is operated in one input mode and two input modes.

Figure 9:
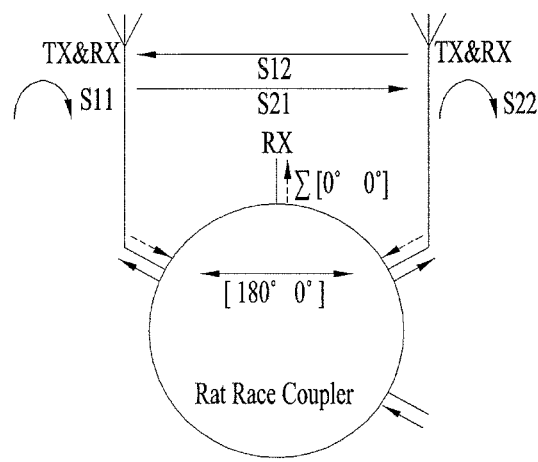
FIG. 9 is an exemplary diagram illustrating antenna arrangement and a signal power flow at RF-front end according to the present invention.

FIG. 9 is an exemplary diagram illustrating antenna arrangement and a signal power flow at RF-front end according to the present invention.

FIG. 9 illustrates that a method for making sure of passive SIC while isolating TX path from RX path instead of the existing circulator when two antennas are used using characteristics of the rat race coupler. An RX port is installed in an original TX isolation port using the two input modes of the rat race coupler, whereby signals having the same phase may be received by the two antennas.

Referring to an SIC operation characteristic, SI signals that return after being generated due to antenna mismatch are S11 and S22 in FIG. 9. An SI signal entering an RXP port is S11−S22+S12−S21. Due to a characteristic of an antenna which is a passive electrical element, S12 equals to S21 irrespective of a surrounding environment. Thus, S11−S22 is an SI signal that substantially enters the RXP port. In this case, it is possible to obtain significantly high TX-RX isolation through passive SIC.

Figure 10:
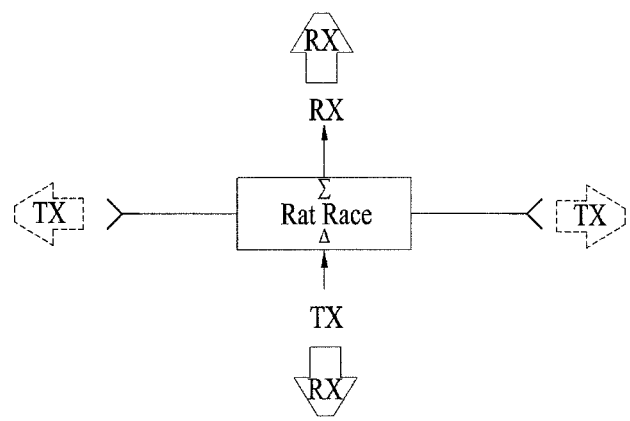
FIG. 10 is a diagram illustrating a main beam direction of TX and RX patterns when a rat race coupler is used.

FIG. 10 is a diagram illustrating a main beam direction of TX and RX patterns when a rat race coupler is used.

In FIG. 10, since Tx signals are radiated as signals of different phases of 180 degrees through two antennas TRx a and TRx b, end-fire type beams are generated. Also, in FIG. 10, since Rx signals of the same phase are received, broadside type beams are generated. Therefore, a problem occurs in that RX and TX beam directions for transmission and reception are different from each other in an orthogonal direction.

Figure 11:
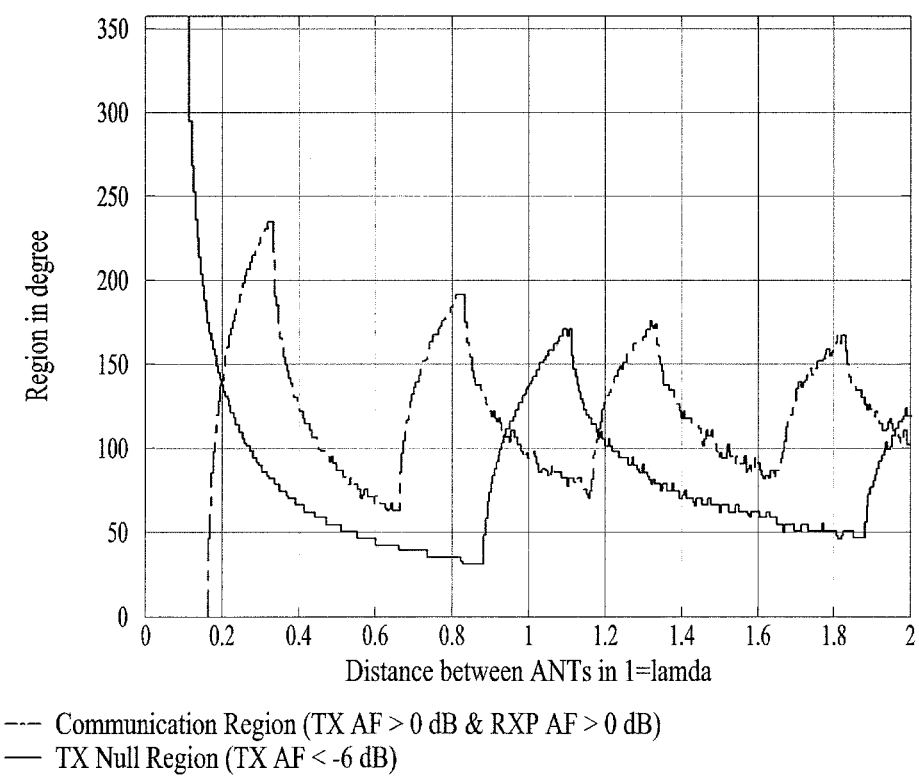
FIG. 11 is a diagram illustrating a conformity level of TX and RXP beam patterns according to antenna interval and a width of a TX null region.

FIG. 11 is a diagram illustrating a conformity level of TX and RXP beam patterns according to antenna interval and a width of a TX null region.

Figure 12:
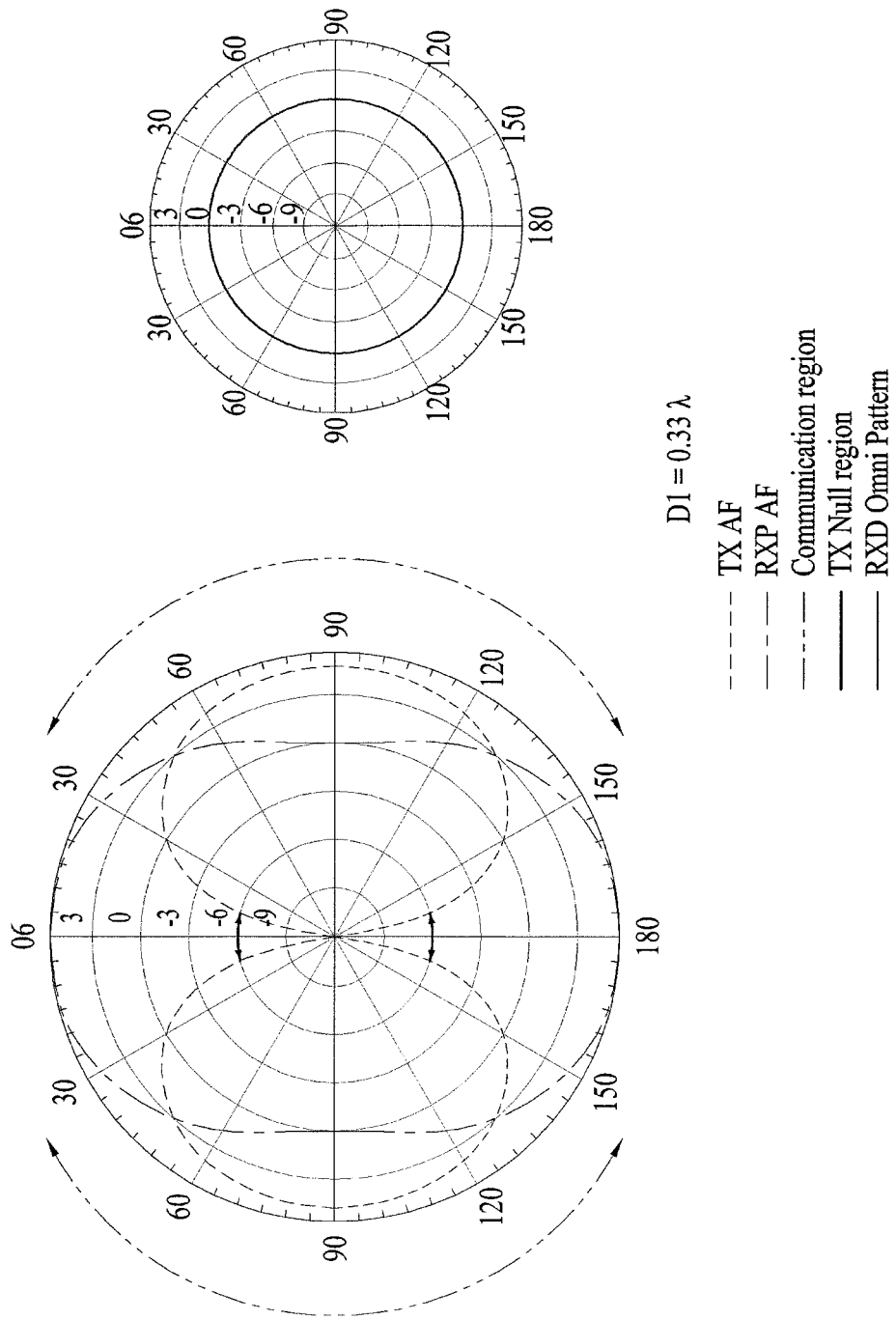
FIG. 12 illustrates TX and RX individual beam patterns when an interval D1 between antennas is $\frac{1}{2}\lambda$.

FIG. 11 illustrates a region where TX and RX beam patterns are overlapped with each other, that is, an available communication region, and an unavailable communication region, that is, null region. Also, this rat race coupler based passive SIC circuit has been developed for SISO or MISO system, and SIC performance, particularly cross talk SIC performance is greatly affected by antenna arrangement. Therefore, a problem occurs in that it is difficult to extend the current system to a MIMO system which uses multiple antennas. FIG. 12 illustrates TX and RX individual beam patterns when an interval D1 between antennas is ⅓λ.

Figure 13:
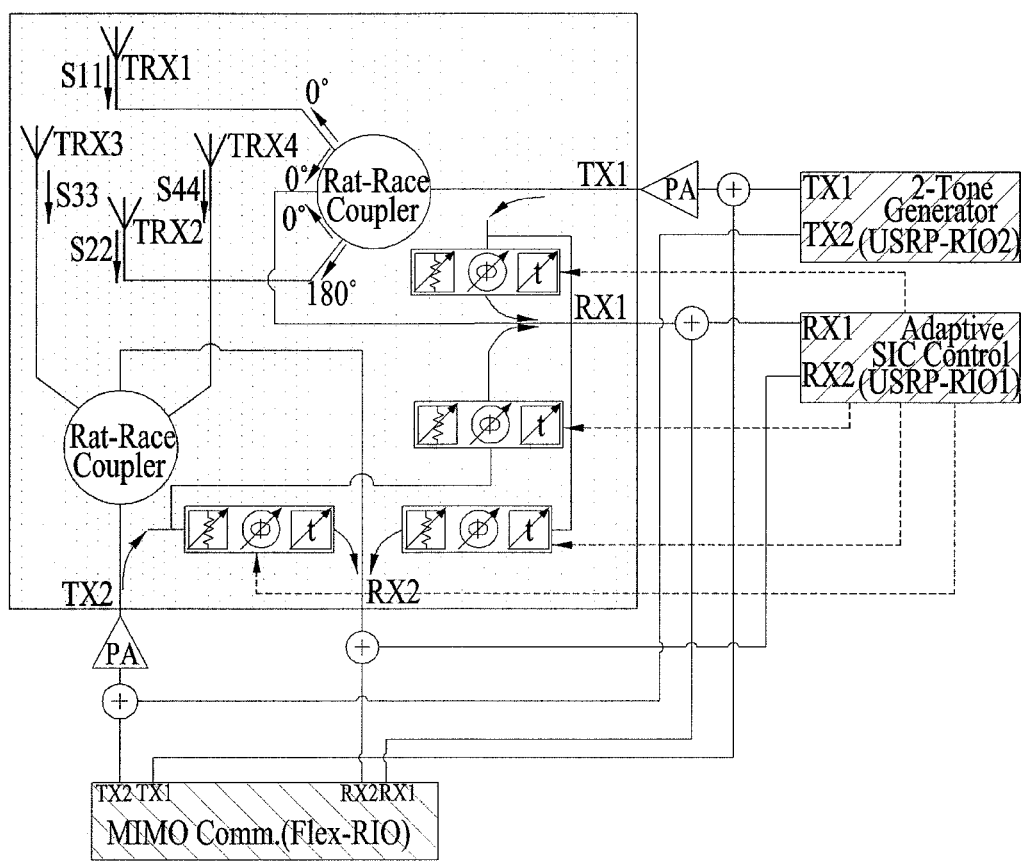
FIG. 13 is a circuit diagram that TRx type antenna and a rat race coupler are used and 2×2 MIMO is supported in accordance with one embodiment of the present invention.

FIG. 13 is a circuit diagram that TRx type antenna and a rat race coupler are used and 2×2 MIMO is supported in accordance with one embodiment of the present invention.

Although FIG. 13 illustrates a configuration for canceling analog self-interference by using various elements such as a power amplifier (PA), an attenuator, a phase shifter, and a delay timer, since the configuration is not a core of the present invention, its detailed description will be omitted.

Referring to FIG. 13, due to the characteristic of the one-input mode of the rat-race coupler, when a signal Tx 1 output from a Tx chain enters one port of the rat race coupler, a signal entering any one TRx 1 antenna of one antenna pair and a signal entering the other one TRx 2 antenna have a phase difference of 180 degrees. This is equally applied to the other antenna pair. If Tx 2 signal output from the Tx chain enters one port of the rat race coupler, a signal entering any one TRx 3 antenna of the other antenna pair and a signal entering the other one TRx 4 antenna have a phase difference of 180 degrees. Although SI signals that return after being generated due to antenna mismatch exist, the SI signals are not shown in FIG. 13.

The original TX isolation port (for example, the isolated port of FIG. 8) is connected to an RX chain using the two-input mode of the rat race coupler. The two input ports of the rat race coupler may receive signals having the same phase from the TRx antenna. Referring to the SIC operation characteristic, SI signals that return after being generated due to antenna mismatch are S11 and S22. Therefore, $SI_p$ is S11−S22. Due to the characteristic of the antenna which is the passive electrical element, S12 equals to S21 irrespective of the surrounding environment. Thus, S11−S22 are SI signals that substantially enter the Rx chain. In this case, it is possible to appropriately adjust a distance between the pair of TRx antennas so that S11 and S22 have the most similar levels irrespective of the surrounding environment to satisfy an equation S11−S22=0. As described above, when the equation S11−S22=0 is experimentally satisfied, an interval of ⅙ λ, is maintained between antennas.

In FIG. 13, self-interference signals S33 and S34 generated from two input ports of another rat race coupler may exist due to 2×2 MIMO, and an antenna interval may be obtained to satisfy S33−S34=0. As described above, when the equation S33−S34=0 is experimentally satisfied, an interval of ⅙ λ is maintained between antennas.

As described above, when full-duplex radio communication is implemented, efficiency for frequency resource utilization may be doubled compared to half duplex radio communication. In addition, unlike the existing configuration using the circulator, passive cancellation SIC performance (−25 to 30 dB) is excellent when the rat race coupler is used. Thus, power consumption for additional RF SIC may be reduced. The rat race coupler, which is a core device of the present invention, may be generated using an inductor and a capacitor and thus may be integrated and applied to a UE.

Figure 14:
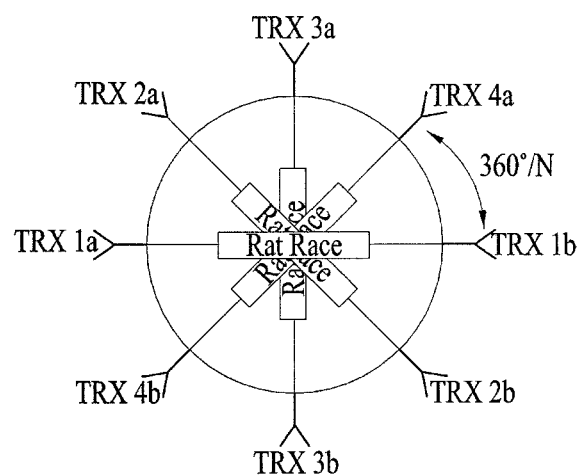
FIG. 14 is a diagram illustrating an antenna arrangement that may solve a problem that RX and TX beam patterns of an antenna for SISO FDR passive SIC based on a rat race coupler are different from each other and maintain high cross talk SIC performance.

FIG. 14 is a diagram illustrating an antenna arrangement that may solve a problem that RX and TX beam patterns of an antenna for SISO FDR passive SIC based on a rat race coupler are different from each other and maintain high cross talk SIC performance.

Referring to FIG. 14, antennas are arranged at constant interval at a certain distance from the center, whereby the antennas are located on a circle at a certain angle. The number of antennas is freely 2 to N, and the antennas are arranged with an angle from the center of 360/N degree in case of N antennas. Two antennas (that is, antenna pair)

symmetrical to each other are connected to the rat race coupler, whereby one TX path and one RX path are provided.

Figure 15:
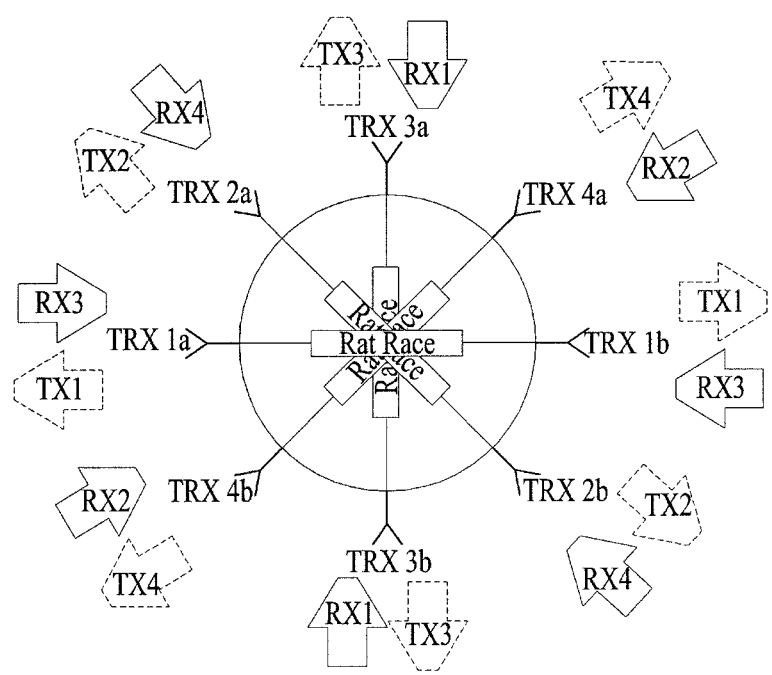
FIG. 15 is a diagram illustrating TX and RX main beam directions of an antenna arranged as shown in FIG. 14 when the number of antennas in FIG. 14 is 8.

FIG. 15 is a diagram illustrating TX and RX main beam directions of an antenna arranged as shown in FIG. 14 when the number of antennas in FIG. 14 is 8.

In a pair of antennas symmetrical to each other (for example, TRX 1a and TRX 1b are symmetrical to each other, and TRX 2a and TRX 2b are also symmetrical to each other), as shown in FIG. 10, TX main beams are generated in the same direction as the symmetric antennas, and RX main beams are generated in a direction vertical to the antenna direction. In this way, since TX and RX main beams are generated in multiple antenna pairs, TX beam direction and RX beam direction of all MIMO antennas support all of regions of 360 degrees. Therefore, a null region where communication is not possible does not exist.

Figure 16:
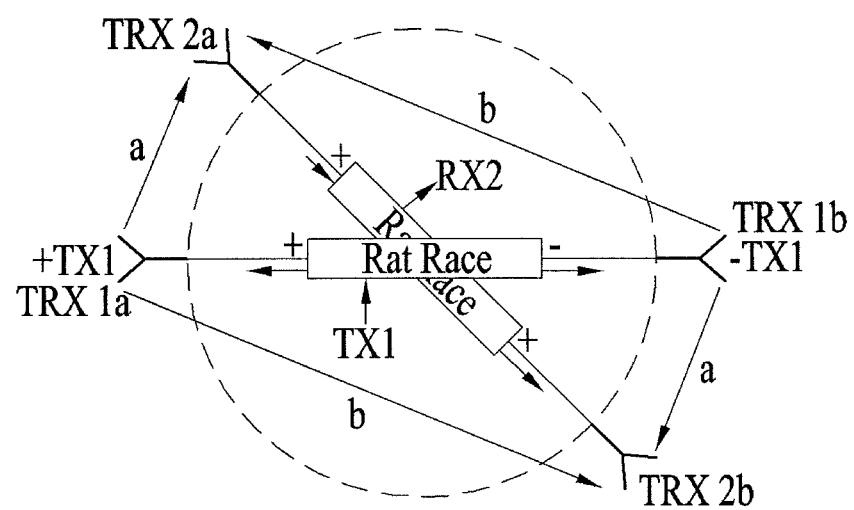
FIG. 16 is an exemplary diagram illustrating a principle that SIC of cross talk of antennas arranged as shown in FIG. 14 is performed.

FIG. 16 is an exemplary diagram illustrating a principle that SIC of cross talk of antennas arranged as shown in FIG. 14 is performed.

FIG. 16 illustrates SIC principle between TX of TRX1 and RX of TRX2, which is applied to two pairs of antennas. TX1 signals having a phase difference (+TX, −TX) of 180 degrees are radiated in antennas TRX 1a and TRX 1b connected to the rat race coupler. The signals radiated as above have time delay such as attenuation of same size while being propagated at the same distance.

Referring to FIG. 16, in view of the characteristics of arrangement of the antennas symmetrical to each other, attenuation and time delay of TRX 1a to TRX 2a may be represented by a, attenuation and time delay of TRX 1b to TRX 2b may be presented by b, and attenuation and time delay of TRX 1a to TRX 2b and TRX 1b to TRX 2a may be presented by b. TX cross talk interferences arriving at TRX 2a and TRX 2b are added to each other by the same phase through the rat race coupler connected thereto. Therefore, a signal of RX2 is as follows.

$$RX2=[(+TX1)\times a+(-TX1)\times b]+[(+TX1)\times b+(-TX1)\times a]$$

$$=a\times(TX1-TX1)+b\times(TX1-TX1)$$

$$=0$$

The signal of RX2 is expressed as RX2=0 as above, and cross talk self-interference entering RX2 from TX1 is completely attenuated and canceled. This is equally applied to even two antenna pairs, and thus all of N antennas achieve passive SIC in which cross talk is canceled.

Although FIG. 16 illustrates that self-interference signals due to a pair of antennas TRX 1a-TRX 1b are attenuated if the signals enter the rat race coupler connected with a pair of TRX 2a-TRX 2b, self-interference signals caused by another pair of antennas arranged such as TRX 3a-TRX 3b, TRX 4a-TRX 4b, . . . , TRX Na-TRX Nb are attenuated if the signals enter the rat race coupler connected with a pair of TRX 2a-TRX 2b.

Also, although FIG. 16 illustrates self-interference signals such as S11 and S22 as self-interference signals returning after being generated by antenna mismatch as shown in FIG. 9, self-interference signals generated by antenna mismatch are attenuated due to antenna arrangement shown in FIGS. 14 and 16.

As described above, the problem that an unavailable communication region may be solved through MIMO when TX and RX beam patterns of one antenna (or a pair of antennas) are different from each other. The problem caused by different TX and RX beam patterns in a system that achieves passive SIC by using the antenna pair together with the rat race coupler may be solved using a MIMO system which uses multiple antennas. Also, a cross talk interference problem generated between several antennas when a full duplex communication system and a MIMO system are used together may be solved. Therefore, frequency usage efficiency may remarkably be increased using full duplex communication and MIMO by antenna arrangement according to the embodiment of the present invention.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for canceling a self-interference signal according to use of an FDR scheme and the device for canceling a self-interference signal are industrially applicable to various wireless communication systems such as 3GPP LTE-A and 5G system.

The invention claimed is:

1. An apparatus for canceling a self-interference signal according to use of a full duplex radio (FDR) scheme, the apparatus comprising:
    a plurality of rat race couplers; and
    a plurality of antenna pairs in which two antennas are paired,
    wherein each antenna of the plurality of antenna pairs is arranged at constant intervals from each other,
    wherein a first output port of two output ports of a first rat race coupler in the plurality of rat race couplers is connected to a first antenna of a first antenna pair and a second output port of the two output ports of the first rat race coupler is connected to a second antenna of the first antenna pair,
    wherein a third output port of two output ports of a second rat race coupler in the plurality of Rat race couplers is connected to a third antenna of a second antenna pair, and a fourth output port of the two output ports of the second rat race coupler is connected to a fourth antenna of the second antenna pair.

2. The apparatus according to claim 1, wherein the first antenna pair is arranged at a same distance from a center of the first rat race coupler.

3. The apparatus according to claim 1, wherein the second antenna pair is arranged at a same distance from a center of the second rat race coupler.

4. The apparatus according to claim 1, wherein a number of the plurality of pairs is an even number.

5. The apparatus according to claim 1, wherein each of the antennas is transmitting and receiving antennas for enabling transmission and reception of signals.

6. A method for canceling a self-interference signal according to use of a full duplex radio (FDR) scheme, the method comprising:

arranging, each antenna of a plurality of antenna pairs in which two antennas are paired, at constant intervals from each other;

connecting a first output port of two output ports of a first rat race coupler in a plurality of rat race couplers to a first antenna of a first antenna pair and connecting a second output port of the two output ports of the first rat race coupler to a second antenna of the first antenna pair; and connecting a third output port of two output ports of a second rat race coupler in the plurality of rat race couplers to a third antenna of a second antenna pair and connecting a fourth output port of the two output ports of the second rat race coupler to a fourth antenna of the second antenna pair.

7. The method according to claim 6, further comprising arranging the first antenna pair at a same distance from a center of the first rat race coupler.

8. The method according to claim 6, wherein each of the antennas are transmitting and receiving antennas for enabling transmission and reception of signals.

* * * * *